US006974101B2

(12) United States Patent
Hiraguchi

(10) Patent No.: US 6,974,101 B2
(45) Date of Patent: Dec. 13, 2005

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 67 days.

(21) Appl. No.: 10/298,900

(22) Filed: Nov. 19, 2002

(65) Prior Publication Data

US 2003/0094530 A1 May 22, 2003

(30) Foreign Application Priority Data

Nov. 20, 2001 (JP) ........................................ 2001-355154

(51) Int. Cl.⁷ .............................................. G11B 23/07
(52) U.S. Cl. ..................... 242/348; 242/348.2; 360/132
(58) Field of Search ............................. 242/348, 348.2; 360/132

(56) References Cited

U.S. PATENT DOCUMENTS

| | | | |
|---|---|---|---|
| 4,045,821 A | 8/1977 | Fujikura | |
| 4,383,660 A | 5/1983 | Richard et al. | |
| 4,426,047 A | 1/1984 | Richard et al. | |
| 5,332,173 A | 7/1994 | Kubota et al. | |
| 5,570,252 A | 10/1996 | Sumner et al. | |
| 5,868,333 A | 2/1999 | Nayak | |
| 6,034,839 A | 3/2000 | Hamming | |
| 6,349,892 B2 | 2/2002 | Morita et al. | |
| 6,581,865 B1 | 6/2003 | Zweighaft et al. | |
| 6,742,738 B2 | 6/2004 | Hiraguchi | |
| 2003/0071157 A1 * | 4/2003 | Hiraguchi et al. | ....... 242/348.2 |
| 2003/0071158 A1 | 4/2003 | Hiraguchi | |
| 2003/0071159 A1 | 4/2003 | Hiraguchi | |
| 2003/0080228 A1 * | 5/2003 | Hiraguchi et al. | ........ 242/348.2 |
| 2003/0094525 A1 * | 5/2003 | Hiraguchi | .................... 242/348 |
| 2003/0094527 A1 * | 5/2003 | Hiraguchi | .................... 242/348 |
| 2003/0094528 A1 * | 5/2003 | Hiraguchi | .................... 242/348 |
| 2003/0094531 A1 * | 5/2003 | Hiraguchi | ................ 242/348.2 |
| 2003/0094532 A1 * | 5/2003 | Hiraguchi | ................ 242/348.2 |
| 2003/0106953 A1 | 6/2003 | Hiraguchi | |
| 2003/0178519 A1 * | 9/2003 | Hancock et al. | ............ 242/348 |

FOREIGN PATENT DOCUMENTS

| | | |
|---|---|---|
| JP | 61-61470 B2 | 12/1986 |
| JP | 63-53633 B2 | 10/1988 |
| JP | 9-39832 A | 2/1997 |
| JP | 11-213615 A | 8/1999 |
| JP | 11-242871 A | 9/1999 |
| JP | 11-297032 A | 10/1999 |
| JP | 2000-243056 | 9/2000 |
| JP | 2000-331403 A | 11/2000 |
| JP | 2001-273740 | 10/2001 |

* cited by examiner

Primary Examiner—John Q. Nguyen
(74) Attorney, Agent, or Firm—Sughrue Mion, PLLC

(57) ABSTRACT

In the cartridge, the opening is formed diagonally to an arrow A direction by cutting away a corner portion at a drive device loading side, and the opening faces both the arrow A direction and an arrow B direction. A leader pin and a magnetic tape are drawn out along the minimal length path from the opening. A door, which is formed in a circular arc shape in plan view, is guided (to suppress looseness) by case screw bosses, protrusion portions and a guide surface while the door rotates to turn at an outer side of a pin stand and the reel without deviating from a movement path along the form of curvature of the door, and thus the opening is opened/closed.

20 Claims, 9 Drawing Sheets

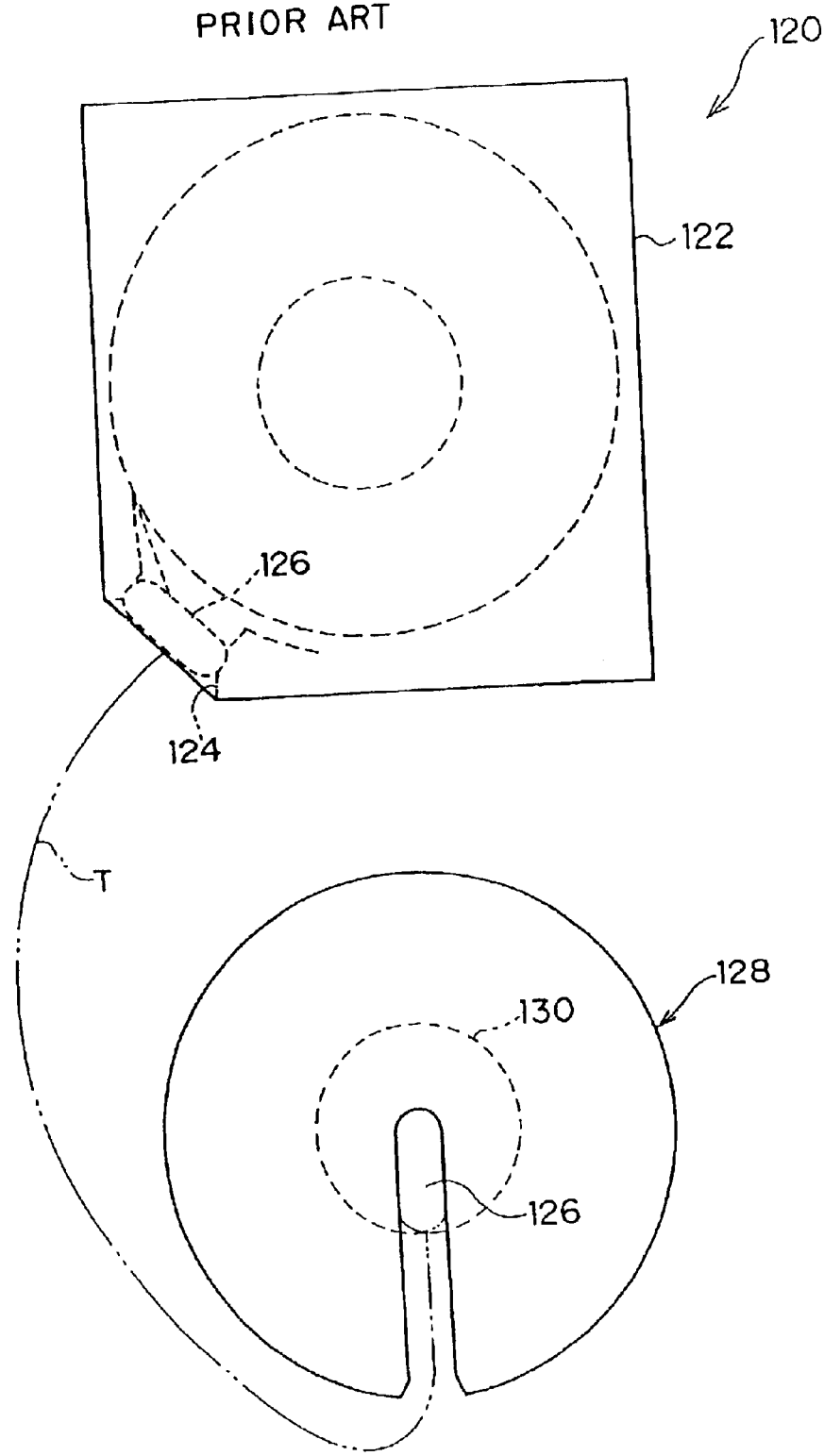

RECORDING TAPE CARTRIDGE

BACKGROUND OF THE INVENTION

1. Field of the Invention

The present invention relates to a recording tape cartridge which rotatably accommodates a single reel onto which a recording tape such as a magnetic tape or the like is wound.

2. Description of the Related Art

Recording tapes such as magnetic tapes and the like are used as external recording media for computers and the like. Recording tape cartridges that accommodate a single reel on which a recording tape is wound take up little space when stored and can record large amounts of information, and are employed as such recording tapes.

An opening aperture is formed in a case of such a recording tape cartridge. The recording tape is drawn out through this opening, and wound around a drive device side winding reel. Accordingly, there have been various schemes in the prior art for preventing dust and the like from ingressing through the opening aperture and adhering to the recording tape.

In a recording tape cartridge 100 shown in FIG. 7, an opening 104 is formed in a side wall 102A of a case 102 (a side wall along a case loading direction A). This opening 104 is structured to be openable and closeable by a door 106 which slides along the loading direction (for examples, refer to Japanese Patent Application Laid-Open (JP-A) Nos. 11-297032, 11-213615, 11-242871 and 2000-331403).

However, with this position of the opening aperture 104, it is necessary that a drive device side operation member turns a leader pin 108 around from a direction sideward of the case 102 when drawing out the leader pin 108. The leader pin 108 is a leader member attached at an end portion of a magnetic tape T, which is the recording tape. Therefore, a space for this turning around by the operation member must be conserved at the drive device. Moreover, a structure for the turning around by the operation member is complicated, and inevitably leads to an increase in size of the drive device. In addition, another aspect to be considered is that a drawing-out path of the magnetic tape T to a winding reel 110 becomes long.

Alternatively, in a recording tape cartridge 112 shown in FIG. 8, an opening 116 is formed in a front face wall 114A of a case 114 (a forward wall which faces in case loading direction A). This opening 116 is structured to be openable and closeable by a swivel-type door 118, which opens and closes by rotation about a shaft (for examples, refer to JP-A 9-039832 and the specification of U.S. Pat. No. 5,332,173).

In this recording tape cartridge 112, because the opening 116 is formed in the front face wall 114A, there is no requirement for a drive device side operation member to turn the leader member around from a sideward direction when drawing out a magnetic tape T. However, the door 118 opens outward by a large amount. Therefore, it is necessary to conserve space at the drive device side such that opening and closing operations of the door 118 are not impeded. As a result, the drive device becomes larger.

Further, in a recording tape cartridge 120 shown in FIG. 9, an opening 124 is formed by cutting away a corner portion of a case 122. The opening 124 is structured to be opened and closed directly by a leader block 126, which is a leader member connected to an end portion of a magnetic tape T (for examples, refer to Japanese Patent Application Publication (JP-B) Nos. 61-61470 and 63-53633).

If the leader block 126 functioned only as a door for closing the opening 124, then the occurrence of damage, soiling or the like at the leader block 126 would not be a problem. However, the leader block 126 is a structure which is drawn out as is by an operation member and fitted into a hub 130 of a drive device side winding reel 128. Therefore, when damage or soiling occurs at the leader block 126, the leader block 126 may not fit well with the hub 130, and this may have a deleterious effect on running of the magnetic tape T. Moreover, the leader block 126 structures a portion of a winding surface onto which the magnetic tape T is wound. Therefore, there is a risk that, as a result of the aforementioned damage or soiling, data recorded on the magnetic tape T may be damaged or an unrecordable region may be caused at the magnetic tape T.

In addition, the leader block 126 is anchored only at peripheral portions of the opening 124. Therefore, there is a risk that the leader block 126 may fall out if the case 122 is dropped. Moreover, because the leader block 126 is larger in size than a leader pin, there are many more constraints on the form of the case 122.

SUMMARY OF THE INVENTION

In consideration of the circumstances described above, an object of the present invention is to provide a recording tape cartridge in which a covering member, which is capable of reducing size of a space for accommodation thereof at a drive device, can open and close an opening aperture of a structure which is capable of minimizing length of a drawing-out path of a recording tape, without interfering with a reel and a leader member, and with which drive device side opening means, which operates the covering member to open and close the opening aperture, can be provided with a simple construction.

In order to achieve the object described above, according to a first aspect of the present invention, a tape cartridge which is insertable at a tape drive, the tape drive being provided with an opening member which is operably engageable with the tape cartridge at a time of insertion of the tape cartridge and carrying out at least one of reading and writing of data, the tape cartridge includes: a case which includes a front wall portion facing in a direction of insertion of the cartridge, a side wall portion substantially parallel to the cartridge insertion direction, and an angled wall portion connecting the front wall portion and the side wall portion, and angled relative to the cartridge insertion direction; a tape access opening provided at the angled wall portion of the case; a covering member which is reciprocally moveable along a circular arc-form movement path between a closed position for closing the tape access opening and an open position for opening the tape access opening; an operation portion provided at the covering member, the operation portion being capable of moving the covering member in an open position direction when engaged with the opening member of the tape drive by an operation of insertion of the tape cartridge; a window portion provided at the side wall portion of the case, which window portion allows relative engagement of the opening member of the tape drive with the operation member at the time of insertion of the tape cartridge; and a slide guidance portion disposed along the circular arc-form movement path and at least one of line-contacting and surface-contacting the covering member.

According to another aspect of the present invention, in a tape drive for carrying out at least one of reading and writing of data at a tape cartridge that includes: a case which includes a front wall portion facing in a direction of insertion of the cartridge, a side wall portion substantially parallel to the cartridge insertion direction, and an angled wall portion connecting the front wall portion and the side wall portion and angled relative to the cartridge insertion direction; a tape access opening provided at the angled wall portion of the case; a covering member which is reciprocally moveable along a circular arc-form movement path between a closed position for closing the tape access opening and an open position for opening the tape access opening; an operation portion provided at the covering member, the operation portion being capable of moving the covering member in an open position direction when engaged with the tape drive by an operation of insertion of the tape cartridge; a window portion provided at the side wall portion of the case, which window portion allows relative engagement of the tape drive with the operation member of the covering member at a time of insertion of the tape cartridge; and a slide guidance portion disposed along the circular arc-form movement path and at least one of line-contacting and surface-contacting the covering member, the tape drive includes an opening member which is capable of engaging with the operating portion of the covering member and moving the covering member in the open position direction at the time of insertion of the tape cartridge.

BRIEF DESCRIPTION OF THE DRAWINGS

FIG. 9 is a perspective view showing overall structure of yet another conventional recording tape cartridge.

DESCRIPTION OF THE PREFERRED EMBODIMENTS

A recording tape cartridge 10 relating to an embodiment of the present invention will be explained based on FIGS. 1 to 6C. Firstly, general overall structure of the recording tape cartridge 10 will be explained. Then, principal elements of the present invention, an opening 20 and a door 50 which serves as a covering member for opening and closing the opening 20, will be explained. For the sake of convenience of explanation, a loading direction of the recording tape cartridge 10 into a drive device, which is shown as arrow A, is referred to as a forward direction (front side) of the recording tape cartridge 10, and the direction of an arrow B intersecting arrow A is a rightward direction.

[Overall Structure of Recording Tape Cartridge]

Figure 1:
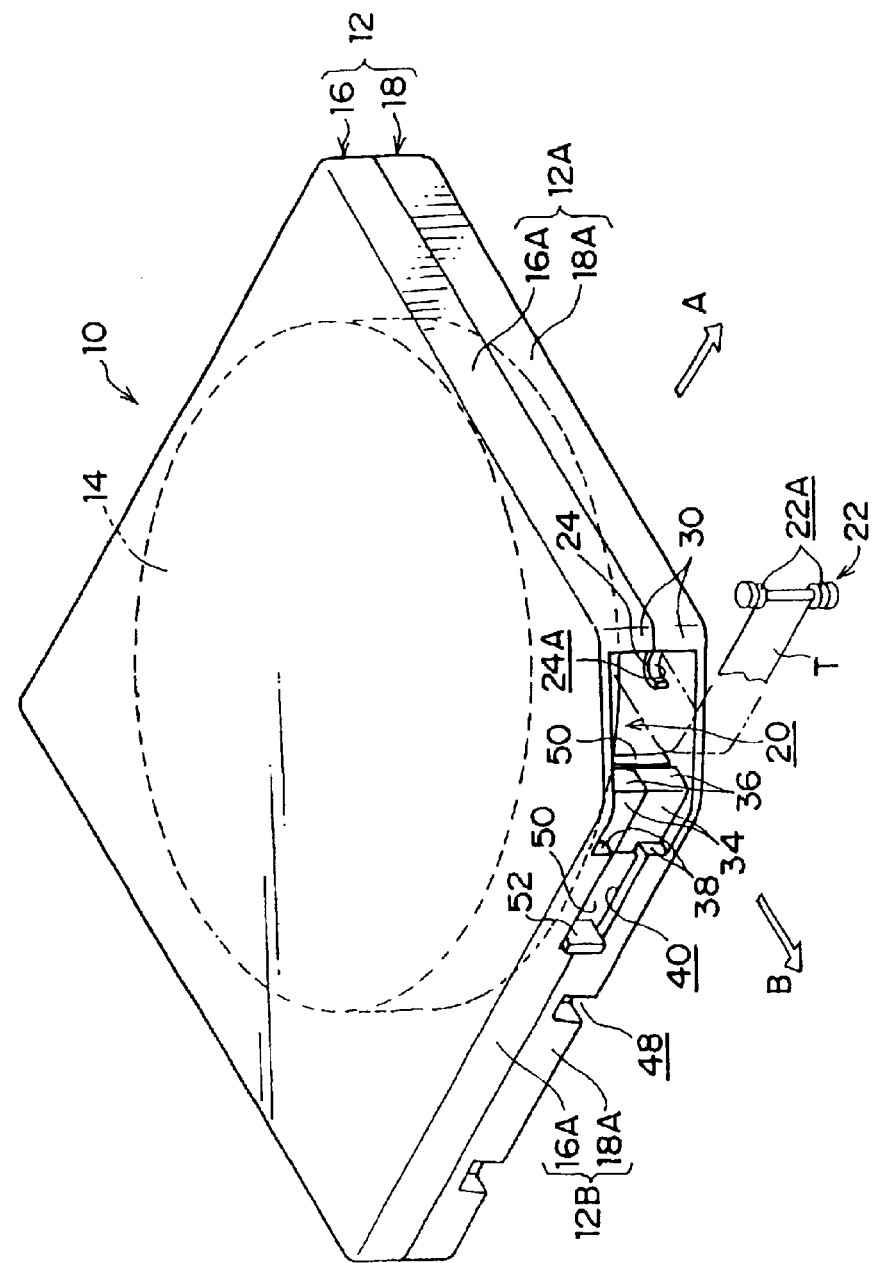
FIG. 1 is a perspective view showing overall structure of a recording tape cartridge relating to an embodiment of the present invention.
Figure 2:
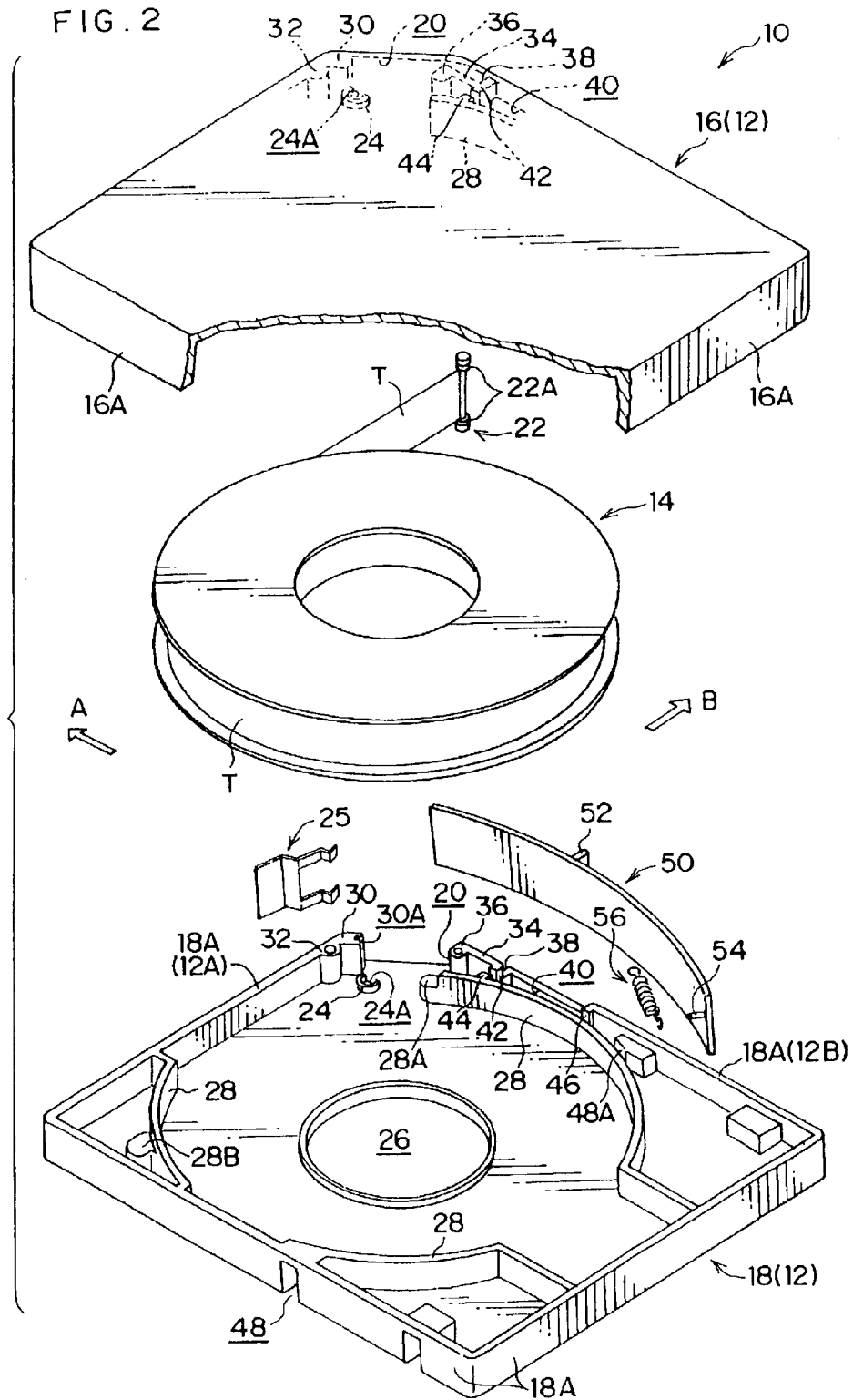
FIG. 2 is an exploded perspective view of the recording tape cartridge relating to the embodiment of the present invention.

FIG. 1 shows a perspective view of overall structure of the recording tape cartridge 10. FIG. 2 shows a schematic exploded perspective view of the recording tape cartridge 10.

As shown in these drawings, the recording tape cartridge 10 is structured to rotatably accommodate a single reel 14 in a case 12. The case 12 is substantially rectangular in plan view. A magnetic tape T is wound onto the reel 14. The magnetic tape T serves as a recording tape which is an information recording/replaying (reading/writing) medium.

The case 12 is structured by matching up and joining two peripheral walls 16A and 18A of an upper case 16 and a lower case 18 to one another. A front-right corner portion of each of the upper case 16 and the lower case 18, which is a single corner portion at a front end side in the direction of loading into the drive device, is cut away. An accommodation space for the reel 14, onto which the magnetic tape T is wound, is provided inside the case 12. Hence, the cut away corner portions of the peripheral walls 16A and 18A of the upper case 16 and the lower case 18 serve as the opening 20 for drawing out the magnetic tape T.

A leader pin 22 is connected at a free end of the magnetic tape T that is drawn out through the opening 20. The leader pin 22 is caught up (engaged) by drawing-out means of the drive device, and subjected to a drawing-out operation. At each of two end portions of the leader pin 22, which protrude beyond width direction end portions of the magnetic tape T, an annular groove 22A is formed. These annular grooves 22A are caught on to by hooks or the like of the drawing-out means. Consequently, in this structure, the hooks or the like do not contact and damage the magnetic tape T when the magnetic tape T is drawn out.

At an inner side of the opening 20 of the case 12, a pair of upper and lower pin stands 24 are provided for positioning and retaining the leader pin 22 in the case 12. The pin stands 24 have semi-tubular forms, and both the end portions of the leader pin 22 are held at recess portions 24A of the pin stands 24 in a state in which the leader pin 22 is standing thereat. Outer peripheral walls of the pin stands 24 are open at a magnetic tape T drawing-out side thereof, to form exit/entry apertures through which the leader pin 22 is removed and inserted.

A leaf spring 25 is fixedly disposed in a vicinity of the pin stands 24. The leaf spring 25 engages with upper and lower end portions of the leader pin 22, and holds the leader pin 22 at the pin stands 24. The leaf spring 25 is structured to resiliently deform appropriately when the leader pin 22 is removed or inserted at the pin stands 24, and to allow movements of the leader pin 22.

A gear aperture 26 is formed at a central portion of the lower case 18. The gear aperture 26 is for exposing an unillustrated reel gear of the reel 14 to the outside. The reel gear meshes with a driving gear of the drive device, and the reel 14 is driven to rotate inside the case 12. Further, the reel 14 is held by free play-restricting walls 28 so as not to rattle about. The free play-restricting walls 28 are provided projecting at interior surfaces of the upper case 16 and the lower case 18, to serve as interior walls partially disposed along a circular path which is coaxial with the gear aperture 26.

A hollow portion 28A is provided continuously with an end portion of the free play-restricting walls 28 in a vicinity of the opening 20. A hole for regulation of position at an interior is formed in the hollow portion 28A. In addition, a hollow portion 28B is formed continuously with the free play-restricting walls 28 at an inner side of a front-left corner portion of the case 12. Another hole for regulation of position, which is a long hole, is formed in the hollow portion 28B. The hollow portion 28A and the hollow portion 28B are disposed co-linearly along the direction of arrow B.

Except for the end portion at which the hollow portion 28A is continuously provided, each of the free play-restricting walls 28 is provided continuously with the peripheral wall 16A or the peripheral wall 18A of the case 12. Thus, outer sides of the free play-restricting walls 28 and the space for disposing the reel 14 are set apart.

[Structure of Opening and of Case at Opening Vicinity]

As described above, the opening 20 is formed by cutting away the front-right corner portion. Therefore, an opening face thereof (an angled wall portion) faces in the direction of arrow A and in the direction of arrow B. Consequently, the drawing-out means of the drive device can access and chuck the leader pin 22 from the direction of arrow A, from the direction of arrow B, or from a direction between the directions of arrow A and arrow B.

As a result, an area in which the pin stands 24 that hold the leader pin 22 can be disposed is large, and a range from which the drawing-out means of the drive device can chuck the leader pin 22 is wide. Accordingly, a disposition position of the pin stands 24 can be specified to meet specifications of drive devices that carry out chucking from direction A and drive devices that carry out chucking from direction B. Thus, a degree of freedom of design of the drive device is broadened.

Figure 3:
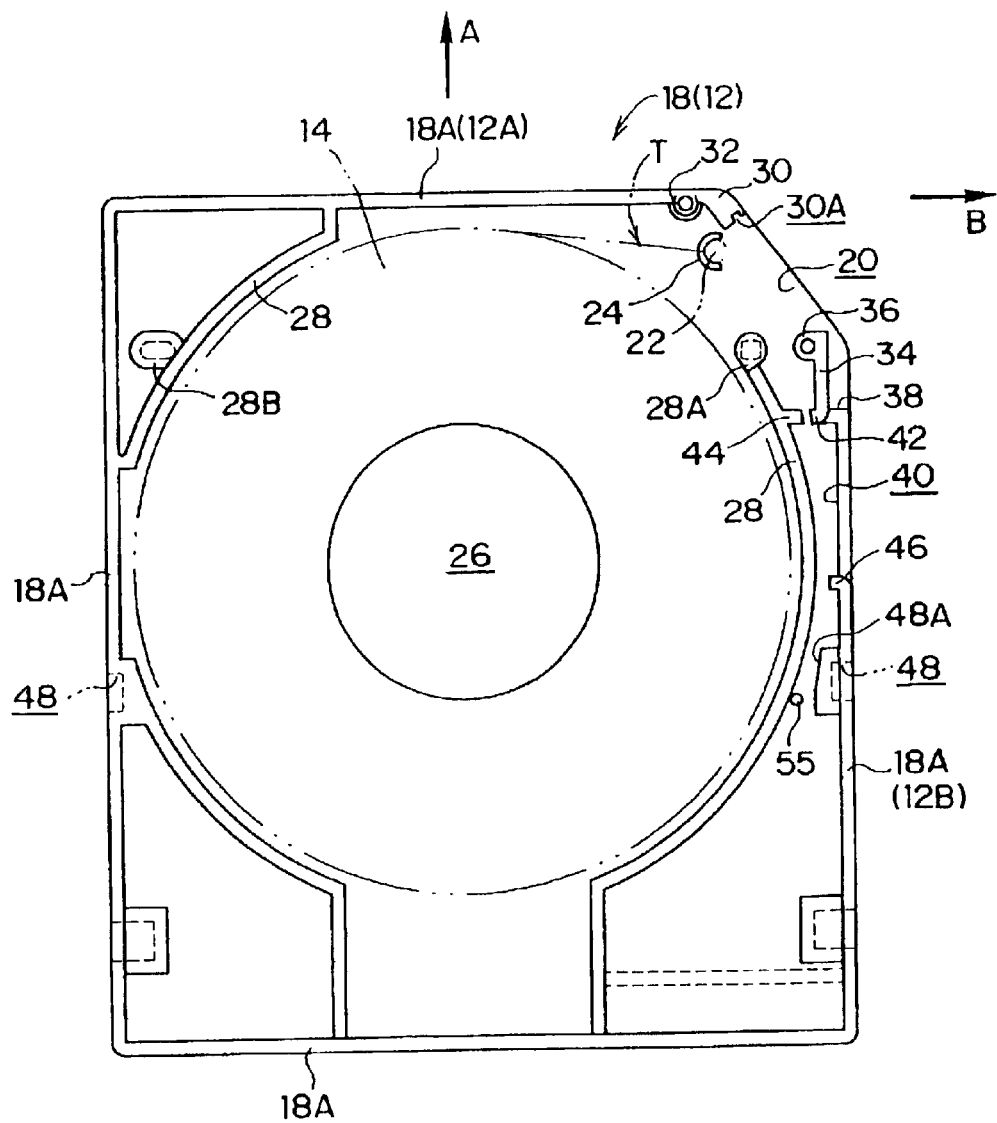
FIG. 3 is a plan view of a lower case which structures the recording tape cartridge relating to the embodiment of the present invention.

As is also shown in FIG. 3, which is a plan view of the lower case 18, a pair of short upper and lower diagonal wall portions 30 is provided at a right corner portion of a front wall 12A of the case 12 (a portion of the peripheral walls 16A and 18A whose outer surface faces in the direction of arrow A). The diagonal wall portions 30 define a front edge portion of the opening 20. The diagonal wall portions 30 curve to run along the opening face of the opening 20, and a wall thickness of the diagonal wall portions 30 is thicker than the front wall 12A.

A recess portion 30A is formed at a thickness direction central portion of the diagonal wall portions 30. A distal end of the door 50, which is described later, enters into the recess portion 30A. Further, a pair of upper and lower screw bosses 32 are provided continuously with an inner side of the front wall 12A in a vicinity of a left end of the diagonal wall portions 30.

A pair of upper and lower offset wall portions 34 is provided at a front end portion of a right wall 12B of the case 12 (a right side wall of the peripheral walls 16A and 18A along the direction of arrow A). The offset wall portions 34 are slightly offset to the inside of the case 12 (leftward). Front ends of the offset wall portions 34 define a rear edge of the opening 20.

A pair of upper and lower screw bosses 36 is provided continuously with an inner side of front end portions of the offset wall portions 34. Outer peripheral portions of the screw bosses 36 function as a guide for the door 50 which is slidable against the door 50 (to prevent rattling). Further, a pair of upper and lower step portions 38 is integrally formed between rear end portions of the offset wall portions 34 and the right wall 12B.

A slit 40 having a predetermined length, which serves as a window portion communicating between the interior and exterior of the case 12, is formed in the right wall 12B rearward of the offset wall portions 34. The slit 40 is for exposing an operation projection 52 of the below-described door 50. The slit 40 is formed by cutting away a lower portion of the peripheral wall 16A and an upper portion of the peripheral wall 18A, which structure the right wall 12B. By also cutting away a lower portion and an upper portion, respectively, of the upper and lower step portions 38, the slit 40 is also opened frontward.

That is, the offset wall portions 34 are provided so as to be offset inward relative to the right wall 12, such that the slit 40, at which the operation projection 52 of the door 50 is operable (engageable) from frontward as described below, is not formed continuously (communicating) with the opening 20. A front end of the offset wall portions 34 defines a rear edge of the opening 20, and a rear end of the offset wall portions 34 defines a substantial front edge of the slit 40. Thus, in this structure, the opening 20 and the slit 40 are formed in the case 12 so as to be mutually non-continuous.

The offset wall portions 34, together with the right wall 12B, correspond to a "side wall along a loading direction of the case into the drive device" of the present invention.

The protrusion portion 42 protrudes from rear end portions of the upper and lower offset wall portions 34, at a side thereof which is opposite to a side thereof at which the step portions 38 are disposed (that is, inward of the case 12) and is provided to span the whole height of the offset wall portions 34. A distal surface of the protrusion portion 42 is curved to correspond to an outer surface of the later-described door 50. In addition, a protrusion portion 44 spanning the whole height is provided at a location of the free play-restricting walls 28 which corresponds to the protrusion portion 42. The protrusion portion 44 is curved to correspond with an inner face of the door 50, and opposes the protrusion portion 42.

When the door 50 opens or closes the opening 20, the protrusion portion 42 and the protrusion portion 44 are slidable against the door 50 while sandwiching the door 50. Thus, the protrusion portion 42 and the protrusion portion 44 are for preventing the ingression of dust into the case 12, and are for guiding the door 50 (preventing looseness).

A further protrusion portion 46 protrudes inward of the case 12 at a portion of the right wall 12B (the peripheral walls 16A and 18A) that defines a rear end of the slit 40. The protrusion portion 46 is also for preventing the ingression of dust into the case 12 and guiding the door 50 (preventing rattling).

A recess portion 48 is formed rearward of the protrusion portion 46 of the lower case 18. The recess portion 48 is recessed toward the inside of the case 12 at a portion of the peripheral wall 18A, which does not include an upper end of the peripheral wall 18A, and upward from a lower face of the case 12, and substantially has a three-sided box shape in sectional view. The recess portion 48 is also formed in a left wall of the case 12. These recess portions 48 serve as, for example, engaging portions for engaging with the drawing-out means of the drive device, with bottom surfaces of the recess portions 48 (surfaces that face downward) serving as reference surfaces for positioning in the drive device. Furthermore, twisting strength of the case 12 is improved by provision of the recess portions 48.

A portion of the right wall 12B (the peripheral wall 18A) that defines the recess portion 48 is curved to correspond to the outer surface of the door 50. This guide surface 48A serves as a guide for the door 50, and is slideable against the outer surface of the door 50 when the opening 20 is opening or closing (to prevent looseness).

The screw bosses 36, the protrusion portions 42, 44 and 46, and the guide surface 48A described above correspond to "guidance means" of the present invention. Of these, the protrusion portions 42 and 46, which are provided spanning the whole height of the interior of the case 12 at both sides in the front-rear direction of the slit 40 (the direction of arrow A), correspond to a "pair of sliding portions" of the present invention.

The upper case 16 and the lower case 18 described above are fixed (joined) by unillustrated screws which are screwed from the lower side into each of the screw bosses 32 and 36 (joining portions), which are located in the vicinities of edge portions of the opening 20. Accordingly, corner portions at both ends of the opening 20, which are defined by free ends of the diagonal wall portions 30 (the front wall 12A) and the offset wall portions 34 (the right wall 12B) and which tend to be severely affected when impacted against a floor or the like by a fall, are securely fixed. Thus, even if the case 12 is dropped, this structure will not be deformed or buckled by the overall weight of the recording tape cartridge 10, so as to cause mispositioning.

In particular, the upper case 16 and the lower case 18 are fixed with screws at the screw bosses 36, which are provided continuously with the offset wall portions 34 located between the opening 20 and the slit 40. As a result, even with the structure being provided with the slit 40 to serve as the window portion in the right wall 12B, dropping strength of the case 12 is maintained. The slit 40 may be defined from above and below simply by a ceiling plate and floor plate of the case 12. However, as mentioned above, by leaving portions of the peripheral walls 16A and 18A above and below to function as ribs, rigidity of the case 12 is maintained, and the dropping strength is more preferable with this structure. Moreover, because the protrusion portions 42, 44 and 46 which structure the guidance means each functions as a rib (a reinforcing member), rigidity of the case 12 is further improved with this structure.

A major diameter across the threads of the screws may be, for example, 2.0 mm. Thus, an external diameter of the screw bosses 32 and the screw bosses 36 may be 4.0 mm. In place of this fixing with screws, projections may project from the upper case 16 at positions corresponding to the screw bosses 32 and 36, while fitting holes which fit with these projections are formed in the lower case 18, and the projections and fitting holes may be fitted with one another. However, in such a case, it is desirable that the upper case 16 and the lower case 18 be fixed with screws at locations within radii of 30 mm of these fitting locations. Further, matching surfaces of the peripheral wall 16A and the peripheral wall 18A (at both side corner portions of the opening 20) may be fixed by welding. However, fixing with screws is more preferable in consideration of dismantling and recycling.

Plate thicknesses of both the upper case 16 and the lower case 18 are set to 2 mm at the area in which the pin stands 24 are disposed (the vicinity of the opening 20), which is thicker than thicknesses at other areas thereof. The case 12 (the upper case 16 and the lower case 18) is formed of a polycarbonate (PC) material. The case 12 may be formed of acrilonitrile butadiene styrene (ABS) or a metal instead of PC.

The purpose of this is to raise the strength of the vicinity of the pin stands 24, which is the location at which the leader pin 22 is held (positioned). Therefore, mispositioning of the leader pin 22, which is the most important component for functioning of the recording tape cartridge 10 (and which must be accurately engaged by the drawing-out means when the recording tape is to be drawn out), subsequent to impacts due to dropping of the case 12 (the recording tape cartridge 10) or the like does not occur.

Positions at which the pin stands 24 are disposed are determined such that an axial center of the leader pin 22 held thereat is positioned on a first imaginary line (not illustrated), which joins the front and rear edge portions of the opening 20, or further inside the case 12 than the first imaginary line. The positions at which the pin stands 24 are disposed are more preferably determined such that the axial center of the leader pin 22 is positioned on a second imaginary line (also not illustrated), which joins axial centers of the screw bosses 32 and the screw bosses 36, or further inside the case 12 than the second imaginary line. In the present embodiment, the pin stands 24 are disposed at a position closer to the screw bosses 32 than to the screw bosses 36. Thus, with this structure, mispositioning of the leader pin 22 due to vibrations of the ceiling plate and the floor plate that accompany dropping of the case 12 or the like can be prevented.

In this case 12, the peripheral wall 16A of the upper case 16 and the peripheral wall 18A of the lower case 18 are set to equal heights. Thus, machining accuracies of portions thereof that match up with one another (accuracies of resin-forming in molds) are at about the same level. Thus, assembly characteristics and dropping impact resistance are made favorable.

A diagonal angle of the opening face of the opening 20 with respect to the direction of arrow A (a diagonal angle of the ceiling plate and floor plate of the case 12 that define the top and bottom of the opening 20) is determined in accordance with requirements for distinguishing (identifying) the recording tape cartridge 10 at a library apparatus. That is, the library apparatus accommodates a plurality of the recording tape cartridge 10 and automatically (i.e., without human intermediation) mounts and removes the recording tape cartridge 10 at the drive device. In a case where there is a plurality of types of the recording tape cartridge 10 to be handled and a plurality of types of drive device, it is necessary to identify a generation, recording capacity or the like of the recording tape cartridge 10. The diagonal angle of the opening face of the opening 20 may be utilized for this identification.

Accordingly, the opening 20 for drawing out of the magnetic tape T, which has been implemented in consideration of strength as described above, can also function as an identification portion in a library apparatus, based on the diagonal angle of the opening face of the opening 20 (to be specific, the diagonal angle of the ceiling plate and floor plate that define the top and bottom of the opening 20). Therefore, insufficient strength of the case 12, a deterioration of dustproofing and complicated mold construction, which are concerns in a situation in which the opening 20 and the identification portion are provided separately (for example, a case in which one or a plurality of through-holes formed in the case 12 serve as an identification portion), can be prevented.

[Door Structure]

Figure 4:
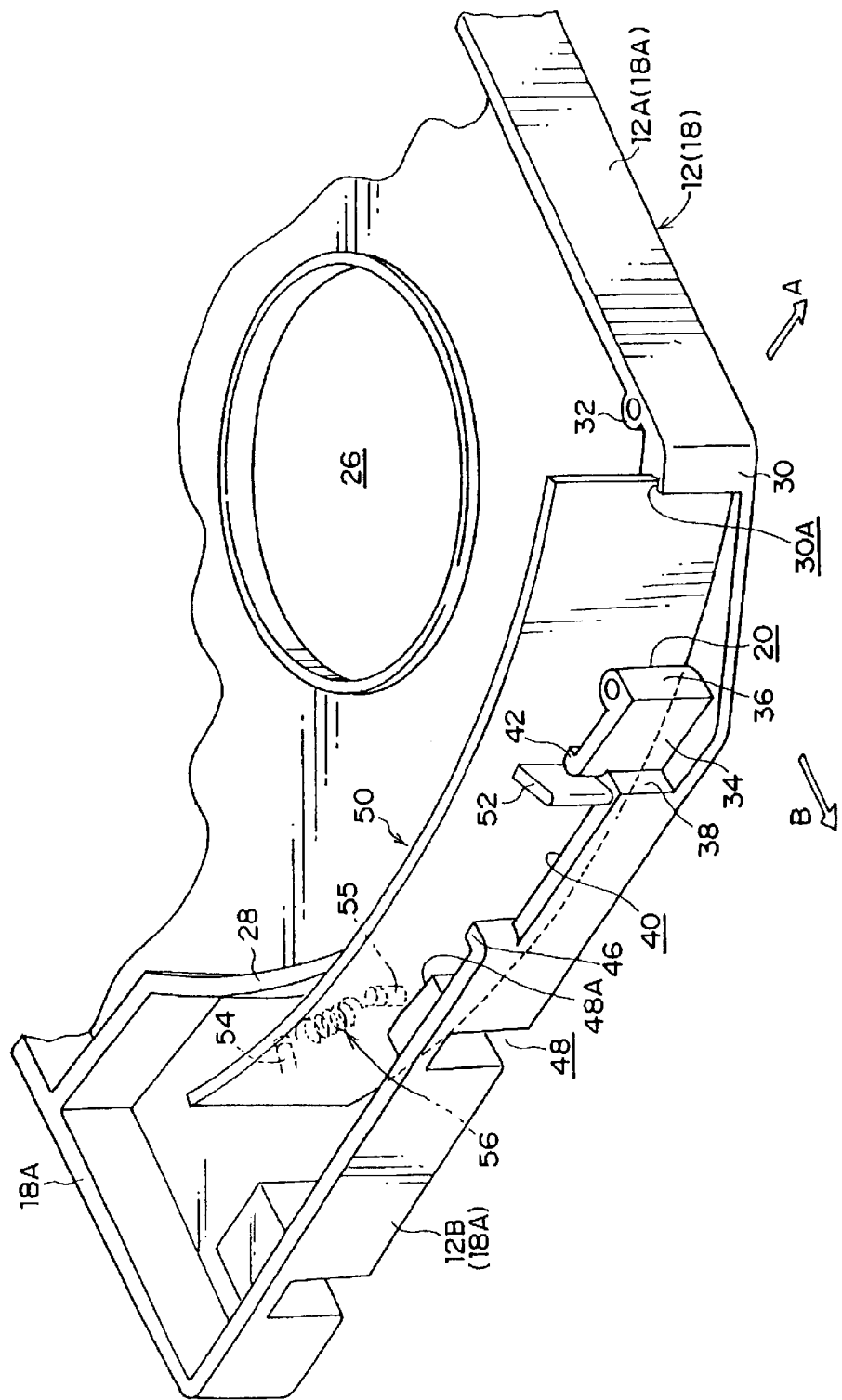
FIG. 4 is a perspective view, viewed with an upper case removed, showing a state in which an opening, which structures the recording tape cartridge relating to the embodiment of the present invention, is closed by a door.
Figure 5:
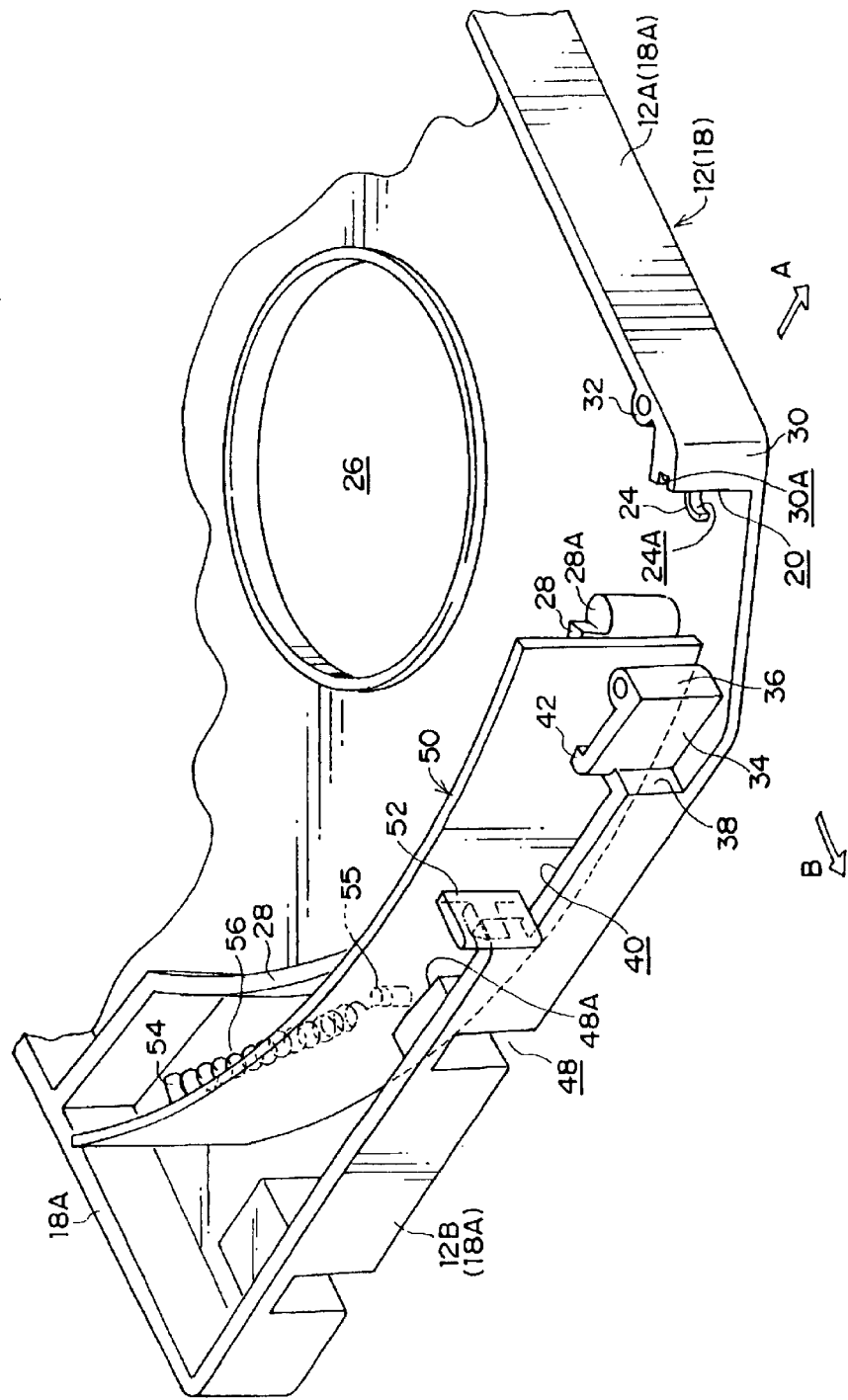
FIG. 5 is a perspective view, viewed with the upper case removed, showing an open state of the opening which structures the recording tape cartridge relating to the embodiment of the present invention.

As shown in FIGS. 4 and 5, which are viewed with the reel 14, the upper case 16 and the like removed, the opening 20 is opened and closed by the door 50, which serves as a covering member. The door 50 is formed in a circular arc form in plan view, which is curved in a plate thickness direction along a predetermined circular circumference, with a plate width (height) of the door 50 set to be substantially the same as an opening height of the opening 20, and a plate length thereof being significantly greater than an opening width of the opening 20.

Figure 6A:
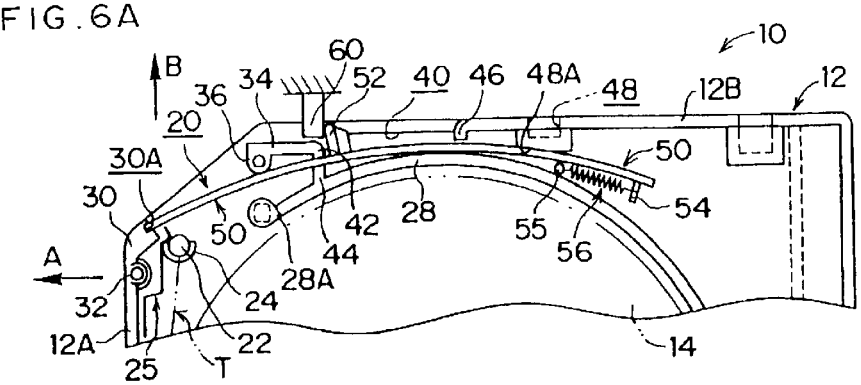
FIG. 6A is a plan view showing an opening process of the opening of the recording tape cartridge relating to the embodiment of the present invention, viewed with the upper case removed, which shows an initial state of engagement of an engaging protrusion of a drive device with an operation projection of the door.

Specifically, in this structure, in a state in which the door 50 has entered into the recess portion 30A of the diagonal wall portions 30 (a closed position), the door 50 closes the opening 20 (see FIG. 6A). The door 50 opens the opening 20 by moving (rotating) substantially rearward along the aforementioned circular circumference, (see FIG. 6B). When an outer peripheral surface of a distal end vicinity of the door 50 reaches a vicinity of the screw bosses 36, the opening 20 is completely opened (an open position; see FIG. 6C). When the opening 20 is open, the door 50 closes the opening 20 by rotating substantially in the opposite direction. In the closed state of the opening 20, the door 50 abuts against at least one of the screw bosses 36, the protrusion portion 42 and the protrusion portion 44.

That is, the door 50 is formed to be curved in an arc shape corresponding to the predetermined circular circumference, which is a movement path of the door 50. In the present embodiment, a position of a center of rotation of the door 50 in a left-right direction is specified to be at a left end vicinity of the case 12, and a position thereof in a front-rear direction is specified to be at a vicinity of the rear end of the slit 40. Consequently, the movement path of the door 50 is closest to the right wall 12B of the case 12 in the vicinity of the rear end of the slit 40. The rotation center and a turning radius of the door 50 may be suitably determined in accordance with the positions of the front and rear edge portions of the opening 20 (the diagonal wall portions 30 and the screw bosses 36). These positions are determined by requirements of the drive device, in accordance with the angle of the facing surface of the opening 20, which is determined by requirements of a library apparatus, and the like.

A rear end portion of a length dimension along the curve of the door 50 is determined so as to be located at a rear-right corner portion, which is rearward of the recess portion 48 of the case 12, in the state in which the opening 20 is closed.

Thus, the door 50 is disposed to be slideable against the screw bosses 36, the protrusion portions 42, 44 and 46, and the guide surface 48A of the case 12, which structure the guidance means, for rotating along the circular circumference direction to open and close the opening 20. Accordingly, in this structure, the door 50 is guided in the opening or closing direction of the opening 20, and rattling is suppressed while the door 50 slides against at least a portion of the screw bosses 36, the protrusion portions 42, 44 and 46, and the guide surface 48A (and the outer surface of the free play-restricting walls 28) when the door 50 is opening or closing the opening 20.

At an outer peripheral surface of the door 50, slightly forward from a length direction central portion thereof, the operation projection 52 projects along a diametric direction of the door 50, to serve as an operation portion. The operation projection 52 is exposed to the outside of the case 12 through the slit 40. When the opening 20 is in the closed state, the operation projection 52 is positioned to be slightly separated from the protrusion portion 42 at the rear end of the offset wall portions 34, and is operable through the portion of the slit 40 that opens frontward at the step portions 38. Dimensions of each portion are determined such that a distal end portion of the operation projection 52 does not protrude further than the outer surface of the right wall 12B (an exterior profile of the case 12) in this state (see FIGS. 4 and 6A).

When the opening 20 is in the opened state, the operation projection 52 is positioned to be slightly separated from the protrusion portion 46 at the rear edge of the slit 40. The dimensions of each portion are determined such that a length direction of the operation projection 52 is substantially perpendicular to the right wall 12B of the case 12 (the direction of arrow A) in this state.

When the case 12 undergoes an operation of loading the case 12 into the drive device, the engaging protrusion 60 (see FIGS. 6A to 6C), which is fixedly provided in the drive device, advances into the slit 40 through a frontward opening portion thereof, and engages with the operation projection 52. At this time, the operation projection moves substantially rearward along the aforementioned circular circumference, and the operation projection 52 moves the door 50 in the opening direction of the opening 20 (that is, in the circular circumference direction).

Consequently, a force acts on the operation projection 52 along the front-rear direction (the direction of arrow A) from the engaging protrusion 60. In addition to a rotation force in the circumferential direction of the door 50, a force component in the diametric direction thereof (a force component whose direction and magnitude change in the process of opening the opening 20) acts on the door 50. However, because the door 50 is guided by the screw bosses 36, the protrusion portions 42, 44 and 46, and the guide surface 48A as described above (looseness is restricted), the door 50 can be moved smoothly by the above-described operation on the operation projection 52.

Although this operation projection 52 communicates between the interior and exterior of the case 12 via the slit for exposure, the slit 40 is always substantially closed by the door 50, which spans substantially the whole height of the interior of the case 12, and by the protrusion portion 42 and protrusion portion 46 which guide the door 50. In addition, a labyrinthine structure is formed between the slit 40 and the accommodation space for the reel 14 by the free play-restricting walls 28 which serve as inner walls and the protrusion portion 44 which guides the door 50. Accordingly, adherence of dust and the like to the magnetic tape T wound onto the reel 14 is prevented.

A spring-holding portion 54 protrudes along the diametric direction of the door 50 from an interior peripheral portion at a rear end vicinity of the door 50. One end portion of a coil spring 56, which serves as urging means (an urging element), is engaged with a spring-engaging portion 55, which is provided inside the case 12 at a vicinity of the recess portion 48. Another end portion of the coil spring 56 is engaged and held at the spring-holding portion 54. Accordingly, in this structure, the door 50 is urged in a direction to close the opening 20 by urging force of the coil spring 56, and the door 50 continuously closes the opening 20.

The coil spring 56 has a length that reaches as far as the rear-right corner portion of the case 12 in the state in which the door 50 opens the opening 20 as described above. Thus, the coil spring 56 is disposed so as to effectively use a space between the free play-restricting walls 28 and the peripheral walls 16A and 18A at the rear-right corner portion.

The door 50 described hereinabove is formed of, for example, a polyoxymethylene (POM) resin, which has a low coefficient of friction and has excellent abrasion resistance with respect to the case 12 constituted of PC. The operation projection 52, the spring-holding portion 54 and the like may be structured as separate bodies (of different materials). Thus, because operation of the door 50 can be carried out smoothly, it is preferable if clearances between end surfaces at the top and bottom of the door 50 and the ceiling plate and floor plate of the 12 are set to the order of 0.05 mm to 0.2 mm each.

Next, operation of the present embodiment will be described.

In the recording tape cartridge 10 having the structure described above, the opening 20 is closed by the door 50 when the recording tape cartridge 10 is not in use (during storage, during transportation, and the like). Specifically, a distal end portion (front end portion) of the door 50 is entered into the recess portion 30A of the diagonal wall portions 30 by the urging force (force component F1) of the coil spring 56. At the same time, an intermediate portion outer peripheral surface of the door 50 abuts against the outer peripheral surface of the screw bosses 36 to close the opening 20.

Further, the slit 40 is substantially closed by the door 50 and the protrusion portions 42 and 46 which are provided at both sides of the slit 40 to be slideable against the door 50. Moreover, a labyrinthine structure is formed in the case 12 by the free play-restricting walls 28 and the protrusion portion 44. Thus, ingression of dust into the accommodation space of the reel 14 is prevented.

Hence, at times of non-use of the recording tape cartridge 10, the adherence of dust and the like to the magnetic tape T that is wound onto the reel 14 accommodated in the case 12 is prevented.

In contrast, when the magnetic tape T is to be used, the recording tape cartridge 10 is loaded into the bucket 60 of the drive device along the direction of arrow A. In accordance with this loading, as shown in FIG. 6A, the engaging protrusion 60, which serves as the opening member (opening means) of the drive device, advances into the slit 40 which opens frontward at the step portions 38, and engages with the operation projection 52 of the door 50.

Figure 6B:
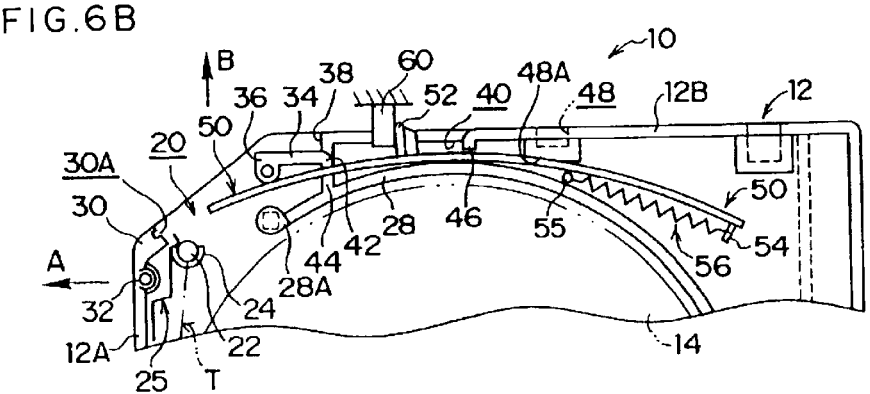
FIG. 6B is a plan view showing the same opening process, which shows a state during opening of the opening.

As the recording tape cartridge 10 (the case 12) is pushed in further, the urging force of the coil spring 56 is opposed by a force of pushing in and, as shown in FIG. 6B, the engaging protrusion 60 moves the operation projection 52 rearward (that is, relatively rearward with respect to the case 12 which is being loaded in the direction of arrow A).

Thus, the door 50 from which the operation projection 52 protrudes is guided by the screw bosses 36, the protrusion portions 42, 44 and 46, and the guide surface 48A. At the same time, the door 50 rotates clockwise, in plan view, along the direction of curvature thereof. That is, the door 50 moves substantially rearward so as to swing at the outer side of the reel 14 and the pin stands 24 without significantly deviating from the movement path along the shape of the curvature, and the door 50 opens the opening 20.

Figure 6C:
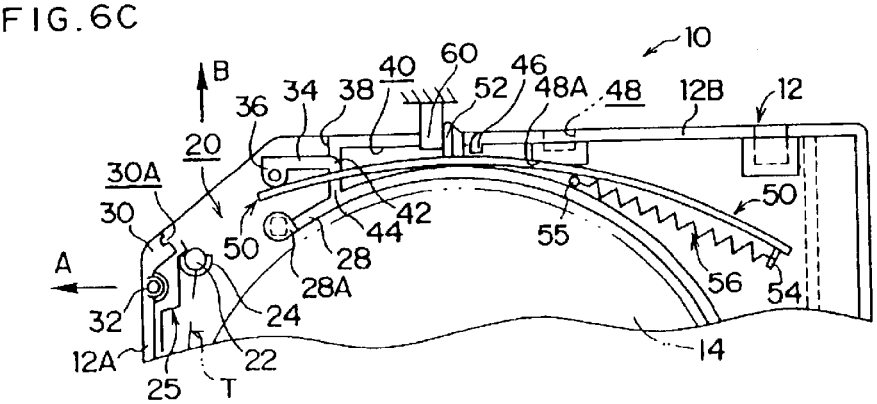
FIG. 6C is a plan view showing the same opening process, which shows a state of complete opening of the opening.
Figure 7:
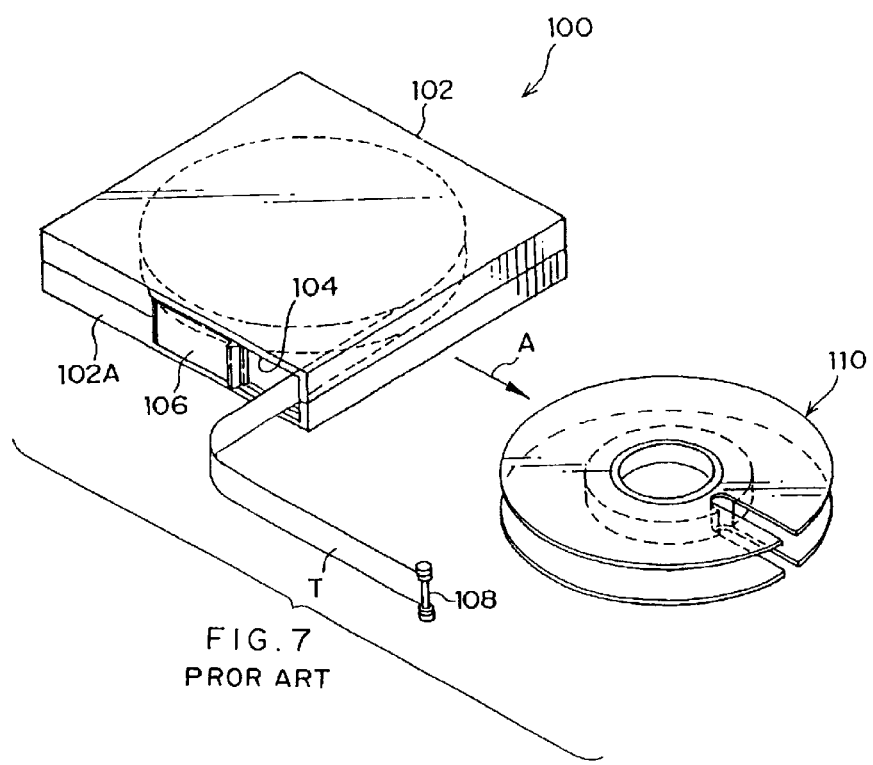
FIG. 7 is a perspective view showing overall structure of a conventional recording tape cartridge.
Figure 8:
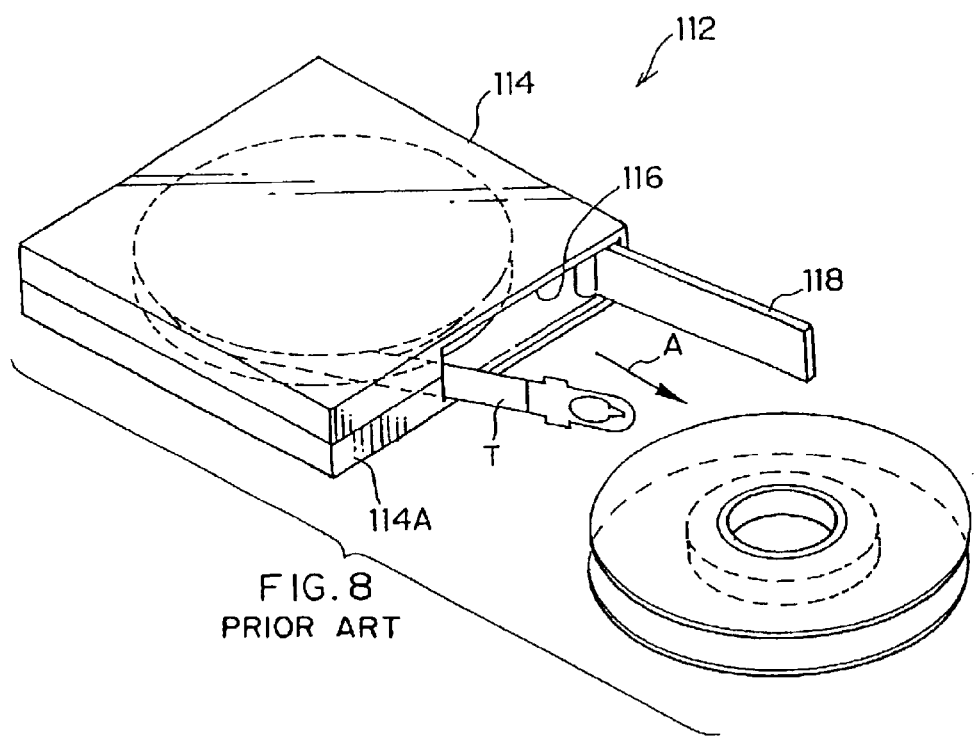
FIG. 8 is a perspective view showing overall structure of another conventional recording tape cartridge.

Then, when the case 12 (the recording tape cartridge 10) has been loaded to a predetermined depth in the drive device, the opening 20 is completely opened, as shown in FIG. 6C. In this state, the recording tape cartridge 10 is positioned in the drive device, and further rotation (substantially rearward movement) of the door 50 is suppressed.

In this state, the drawing-out means of the drive device advances into the case 12 through the opened opening 20, and the drawing-out means takes out the leader pin 22, which has been positioned and accommodated at the pin stands 24, and accommodates the leader pin 22 at the winding reel. Then, the winding reel and the reel 14 are driven to rotate at the same time, and the magnetic tape T is wound around the winding reel while being sequentially drawn out from the case 12. Information recording/replaying is carried out on the magnetic tape T by the recording/replaying head or the like which is disposed along the predetermined tape path.

Subsequently, the magnetic tape T is wound back to the reel 14 again, and the recording tape cartridge 10 is ejected from the drive device. At the time of ejection, a positioning state of the recording tape cartridge 10 is released, and the recording tape cartridge 10 is moved in a direction opposite to the direction of arrow A by the urging force of the coil spring 56 and/or by an unillustrated ejection mechanism.

In accordance with this ejection operation, the door 50 is guided by the screw bosses 36, the protrusion portions 42, 44 and 46, and the guide surface 48A, while being rotated in the closing direction of the opening 20 by the urging force of the coil spring 56. The distal end portion of the door 50 enters into the recess portion 30A of the diagonal wall portions 30, and the door 50 returns to the initial state in which the opening 20 is completely closed.

Here, because the opening 20 is formed by cutting away the loading side corner portion of the rectangular case 12, the opening face of the opening 20 faces in the direction of arrow A and in the direction of arrow B (the facing angle is diagonal with respect to the direction of arrow A). This means that the drawing-out means of the drive device can gain access to the leader pin 22 from a front face side which faces the case 12 in the direction of arrow A, and it is not required that the drawing-out means gain access from a side that is outside of the arrow B side peripheral walls (side walls) 16A and 18A (i.e., from an arrow B side).

Consequently, in this drive device, a path for drawing out the magnetic tape T can be made as short as possible, and the drawing-out means does not require a drive mechanism for turning the magnetic tape T around from the arrow B side of the case 12. Thus, a reduction in size and cost reductions can be expected.

Further, the door 50, which is curvedly formed in the circular arc shape, is rotated to open and close the opening 20 by swinging around an outer side of the reel 14 and the pin stands 24 (and the leader pin 22) without deviating from the movement path along the shape of the curvature. Therefore, the door 50 will not protrude beyond an external profile region of the case 12 during opening and closing of the opening 20.

Consequently, a space for accommodation of the recording tape cartridge 10 in the drive device is small, and the movement path of the door 50 does not interfere with the pin stands 24 (the leader pin 22), the reel 14 and the like in the case 12.

Further yet, it is sufficient that the engaging protrusion 60 of the drive device be fixedly disposed to be engageable with the operation projection 52 of the door 50 simply by advancing into the slit 40 from frontward thereof. Thus, construction is simple. Further again, because the door 50 closes the opening 20 due to the urging force of the coil spring 56, a drive device side mechanism for driving the door 50 in the direction of closing the opening 20 is not required. Thus, construction of the opening means (opening member) of the drive device is made more simple.

Accordingly, with the recording tape cartridge 10 according to the present embodiment, the door 50, which can make a space for accommodating the recording tape cartridge 10 at the drive device smaller, can open and close the opening 20, whose structure can minimize length of the drawing-out path of the magnetic tape T, without the door 50 interfering with the reel 14 and the leader pin 22. Moreover, the engaging protrusion 60, which serves as the opening means (opening member) for operating the door 50 to open and close the opening 20, can be given a simple structure.

Thus, the screw bosses 36, the protrusion portions 42 and 46, and the guide surface 48A, which are provided (continuously provided) protruding toward the interior at an inner face of the right wall 12B of the case 12 (and the offset wall portions 34), and the protrusion portion 44, which is provide protruding toward the exterior at an outer face of the free play-restricting walls 28, structure the guidance means which guides the door 50 in the opening and closing directions of the opening 20. Therefore, there is no need to provide a reduced thickness portion such as a cam channel in the case 12. Therefore, rigidity of the case 12 is high, and the dropping strength can be assured. In particular, the protrusion portions 42, 44 and 46, which are provided integrally at the offset wall portions 34, the free play-restricting walls 28 and the right wall 12B, respectively, also respectively function as ribs (reinforcing members). Therefore, the rigidity of the case 12 is even further improved.

Moreover, as described above, the protrusion portions 42 and 46 that structure the guidance means have a dustproofing function to prevent the ingression of dust and the like into the case 12. Therefore, there is no need to provide dustproofing members (walls and the like) separately from the guidance means. Thus, construction is more simple, and space savings can be expected. Furthermore, the free play-restricting walls 28 and the protrusion portion 44 provided at the free play-restricting walls 28 form a labyrinthine structure, and thus have a dustproofing function. Consequently, dustproofing is improved with a simple construction.

Because the movement path of the door 50 as described above is a circular circumference (a curvilinear shape), the corner portion of the case 12 can be greatly cut away, and the opening 20 can be formed to be large. That is, in a case in which, for example, a flat plate-form covering member is inclined relative to the direction of arrow A, this covering member will be accommodated in an exterior profile region of the case 12. In this situation, an operation area that is required for changing the attitude of the covering member by linear displacement or rotary displacement to open and close the opening 20 will be greater, and the opening 20 will have to be made smaller (the cutaway portion of the corner portion of the case 12 that forms the opening 20 will have to be made smaller) such that the operation of the covering member does not interfere with the leader pin 22, the reel 14 and the like. However, with the recording tape cartridge 10 relating to the present embodiment, because the door 50 which opens and closes the opening 20 by turning on the predetermined circular arc without deviating therefrom as described above is provided, an increase in size of the opening 20 can be enabled.

In particular, a center of rotation of the door 50 for opening and closing the opening 20, whose opening face is diagonal with respect to the direction of arrow A, can be determined independently of the position of an axial center of the reel 14. Therefore, the angle of inclination of the opening face of the opening 20 relative to the direction of arrow A, the size of the opening 20 (a separation between front and rear edge portions thereof, and the like can be freely specified. Thus, the door 50 can be provided for opening and closing the opening 20, with the opening 20 having dimensions and shape freely selected in accordance with requirements of the drive device and the like. That is, with the structure in which the door 50 is provided, a degree of freedom of design of the opening 20 (and thus the recording tape cartridge 10) is improved.

Further, when the length of the path for drawing out the magnetic tape T is minimized as described above, a running path of the magnetic tape T will inevitably be shortened too. As a result, contact friction of the magnetic tape T with tape guides (for example, rotatably supported rollers and the like) can be reduced.

Furthermore, the opening 20 is formed by cutting away the corner portion of the case 12, and faces in the direction of arrow A and in the direction of arrow B. Thus, a range of directions of access to the leader pin 22 by the drawing-out means (by hooks thereof or the like) is widened. Therefore, positions at which the leader pin 22 can be disposed in the case 12 are broadened. Therefore, given that the operation path of the door 50 as described above must not interfere with positions at which the leader pin 22 can be disposed in practice, a degree of freedom of design of the drive device is improved.

Further again, because the door 50 is a separate member from the leader pin 22 that is drawn out from the case 12, in this structure the door 50 cannot be taken out from the case 12 in an assembled state. Thus, the door 50 will not be removed from the case 12 by an impact when the recording tape cartridge 10 is dropped or the like. Moreover, the leader pin 22 is accommodated in the case 12 in a firmly shut state when the opening 20 has been closed by the door 50 at a time of non-use. Thus, the leader pin 22 is less likely to become damaged or soiled. Consequently, drawing out and running the magnetic tape T at the drive device will not affect the drive device, and the magnetic tape T itself will not suffer from damage.

Still further, a structure in which a magnetic tape T is employed as a recording tape is used in the embodiment described above. However, the present invention is not limited thus. It is sufficient that the recording tape is one of long tape-form information recording/replaying media which can record information and replay information that has been recorded. Of course, the recording tape cartridge relating to the present invention can be applied to recording tape of any kind of recording/replaying system.

As is explained above, a recording tape cartridge relating to the present invention has excellent effects in that a covering member, which can reduce size of an accommodation space of the recording tape cartridge in a drive device, can open and close an opening aperture, which has a structure which can minimize length of a drawing-out path of a recording tape, without interfering with a reel and a leader member, and a drive device side opening means which operates the covering member to open and close the opening aperture can have a simple structure.

What is claimed is:

1. A tape cartridge which is insertable at a tape drive, the tape drive being provided with an opening member which is operably engageable with the tape cartridge at a time of insertion of the tape cartridge and carrying out at least one of reading and writing of data, the tape cartridge comprising:

a case which includes a front wall portion facing in a direction of insertion of the cartridge, a side wall portion substantially parallel to the cartridge insertion direction, and an angled wall portion connecting the front wall portion and the side wall portion, and angled relative to the cartridge insertion direction;

a tape access opening provided at the angled wall portion of the case;

a covering member which is reciprocally moveable along a circular arc-form movement path between a closed position for closing the tape access opening and an open position for opening the tape access opening;

an operation portion provided at the covering member, the operation portion being capable of moving the covering member in an open position direction when engaged with the opening member of the tape drive by an operation of insertion of the tape cartridge;

a window portion provided at the side wall portion of the case, which window portion allows relative engagement of the opening member of the tape drive with the operation member at the time of insertion of the tape cartridge; and a slide guidance portion disposed along the circular arc-form movement path and at least one of line-contacting and surface-contacting the covering member.

2. The tape cartridge of claim 1, further comprising a reel around which a tape is wound, the reel being accommodated in the case such that the tape can be drawn out through the tape access opening.

3. The tape cartridge of claim 2, further comprising a partition wall portion disposed between the reel and the circular arc-form movement path.

4. The tape cartridge of claim 3, wherein the slide guidance portion comprises at least one protrusion portion formed at the partition wall portion and at least one protrusion portion formed at the side wall portion of the case.

5. The tape cartridge of claim 1, wherein the window portion comprises a long, narrow slit provided at the side wall portion of the case and extending along the cartridge insertion direction.

6. The tape cartridge of claim 1, wherein the window portion comprises structure such that the window portion does not physically interfere with the opening member of the tape drive and the operation member at the time of insertion of the tape cartridge.

7. The tape cartridge of claim 1, further comprising a wall portion for reinforcement between the window portion and the tape access opening, which makes the window portion and the tape access opening non-continuous with one another.

8. The tape cartridge of claim 7, wherein the slide guidance portion comprises a portion of the wall portion for reinforcement and a protrusion portion formed at the side wall portion of the case.

9. The tape cartridge of claim 1, wherein the case appears substantially rectangular in plan view.

10. The tape cartridge of claim 1, wherein the case is formed of a resin, and the covering member is formed of an abrasion-resistant resin which is different from the resin of the case.

11. The tape cartridge of claim 1, further comprising an urging element which continuously urges the covering member in a closed position direction.

12. The tape cartridge of claim 11, wherein the case comprises an upper case and a lower case which structure the case.

13. The tape cartridge of claim 12, further comprising a plurality of joining portions for joining the upper case and the lower case.

14. The tape cartridge of claim 13, further comprising a leader member attached to a tape end, wherein the leader member is detachably held at a position on or at an inner side of a line from one to another of joining portions that are located at vicinities of end portions, in plan view, of the tape access opening.

15. The tape cartridge of claim 14, wherein the leader member comprises a leader pin, and the tape cartridge further comprises a holding structure which detachably holds the leader pin at each side in a longitudinal direction of the leader pin.

16. A tape drive for carrying out at least one of reading and writing of data at a tape cartridge that includes:

a case which includes a front wall portion facing in a direction of insertion of the cartridge, a side wall portion substantially parallel to the cartridge insertion direction, and an angled wall portion connecting the front wall portion and the side wall portion and angled relative to the cartridge insertion direction;

a tape access opening provided at the angled wall portion of the case;

a covering member which is reciprocally moveable along a circular arc-form movement path between a closed position for closing the tape access opening and an open position for opening the tape access opening;

an operation portion provided at the covering member, the operation portion being capable of moving the covering member in an open position direction when engaged with the tape drive by an operation of insertion of the tape cartridge;

a window portion provided at the side wall portion of the case, which window portion allows relative engagement of the tape drive with the operation member of the covering member at a time of insertion of the tape cartridge; and a slide guidance portion disposed along the circular arc-form movement path and at least one of line-contacting and surface-contacting the covering member, wherein the tape drive comprises an opening member which is capable of engaging with the operating portion of the covering member and moving the covering member in the open position direction at the time of insertion of the tape cartridge.

17. The tape drive of claim 16, wherein the opening member projects in a direction intersecting the tape cartridge insertion direction.

18. The tape drive of claim 16, wherein the opening member is stationary in the tape drive.

19. The tape drive of claim 16, wherein the opening member advances into the tape cartridge at the time of insertion of the tape cartridge.

20. The tape drive of claim 19, wherein the opening member advances through the window portion of the tape cartridge at the time of insertion of the tape cartridge.

* * * * *